Figure 1:
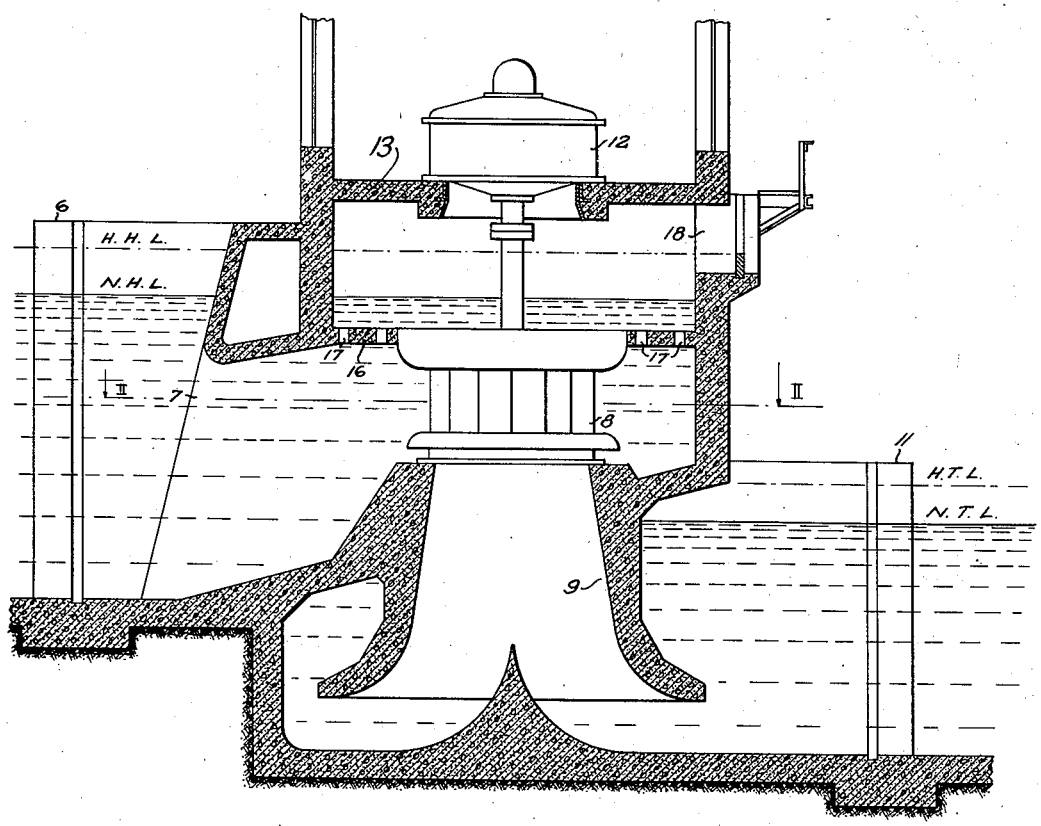

May 26, 1936.  A. PFAU  2,042,071
HYDRAULIC TURBINE
Filed Oct. 8, 1934  2 Sheets-Sheet 1

Inventor
A. Pfau
by
Attorney

May 26, 1936.  A. PFAU  2,042,071

HYDRAULIC TURBINE

Filed Oct. 8, 1934  2 Sheets-Sheet 2

Patented May 26, 1936

2,042,071

UNITED STATES PATENT OFFICE 2,042,071

HYDRAULIC TURBINE

Arnold Pfau, Milwaukee, Wis., assignor to Allis-Chalmers Manufacturing Company, Milwaukee, Wis., a corporation of Delaware Application October 8, 1934, Serial No. 747,286

6 Claims. (Cl. 253—117)

This invention relates to improvements in hydraulic turbine installations and more particularly to such installations in which the water is supplied to the turbine by way of an open flume. A very large number of hydraulic turbine installations are of the so-called vertical shaft open flume type in which the turbines are set centrally in substantially square channels or flumes which are open to the atmosphere and in which the water can therefore rise to the forebay or headwater level. Such installations are generally low head and the water level in the flume is often very close to the turbine inlet. This is often merely a rectangular opening in a wall which restricts the flow of water therethrough. Such installations are not however efficient and means must be provided to increase the power output thereof. Increase in the power output with the same head requires installation of improved turbines which, however, alone are not sufficient to produce the desired increase in power, such increase in power being obtainable rather by improvement in the hydraulic conditions in the flume. Maximum power output requires flow of a maximum quantity of water through the flume which requires a higher velocity in the water supplied to the turbine by any predetermined size of flume. Such increase of velocity of water flow in a square flume produces disturbances in such flow which result in the formation of eddies and whirls which draw air into the turbine and reduce its efficiency and often have a highly corrosive effect on the immersed parts of the turbine. It is therefore necessary that the flume cross section be changed and that the turbine be set eccentrically in the flume to guide and distribute the water uniformly to all portions of the turbine, and to supply an adequate quantity of water to all portions of the turbine. The position of the turbine relative to the flume is, however, usually fixed by the position of the driven mechanism such as an electric generator which is connected therewith. Change in the flume cross section should produce a somewhat spiral shaped flume which, however, does not completely eliminate the formation of eddies and whirls. In open flume installations, a plurality of flumes are usually arranged in parallel and are separated merely by a sufficient wall thickness to withstand the pressure of the water in the flume. Any change in the flume cross section area must necessarily leave the thickness of the walls between the flume without material change in order to retain the required strength to withstand the pressure of the water and to supply sufficient support for any superstructure thereon. The spiral form of flume is the proper solution of the problem of supplying an adequate amount of high velocity water to a hydraulic turbine, but means must still be provided by which the formation of eddies and whirls in the water flow through the flume is reduced, and in which such eddies and whirls as are formed are prevented from drawing air into the turbine and from otherwise affecting the flow of water to the turbine. Means should also be provided in connection with all hydraulic turbine installations, to avoid the continuance of surges upon variation in the quantity of water flowing through the turbine.

It is therefore among the objects of the present invention to provide a construction for hydraulic turbine installations of the open flume type in which a turbine may be used to utilize the entire hydraulic head as completely as possible.

Another object of the invention is to provide an improved construction for open flume hydraulic turbine installations which will permit the use of turbines requiring a higher water flow velocity than was previously possible.

Another object of the invention is to provide means for use in open flume hydraulic installations which will produce a constant and uniform flow of water to the turbine.

Another object of the invention is to provide means for use in open flume hydraulic turbine installations which will eliminate the formation of whirls and eddies in the water particularly adjacent the inlet to the turbine and which will prevent the continuation of surges in the water flow.

Figure 2:
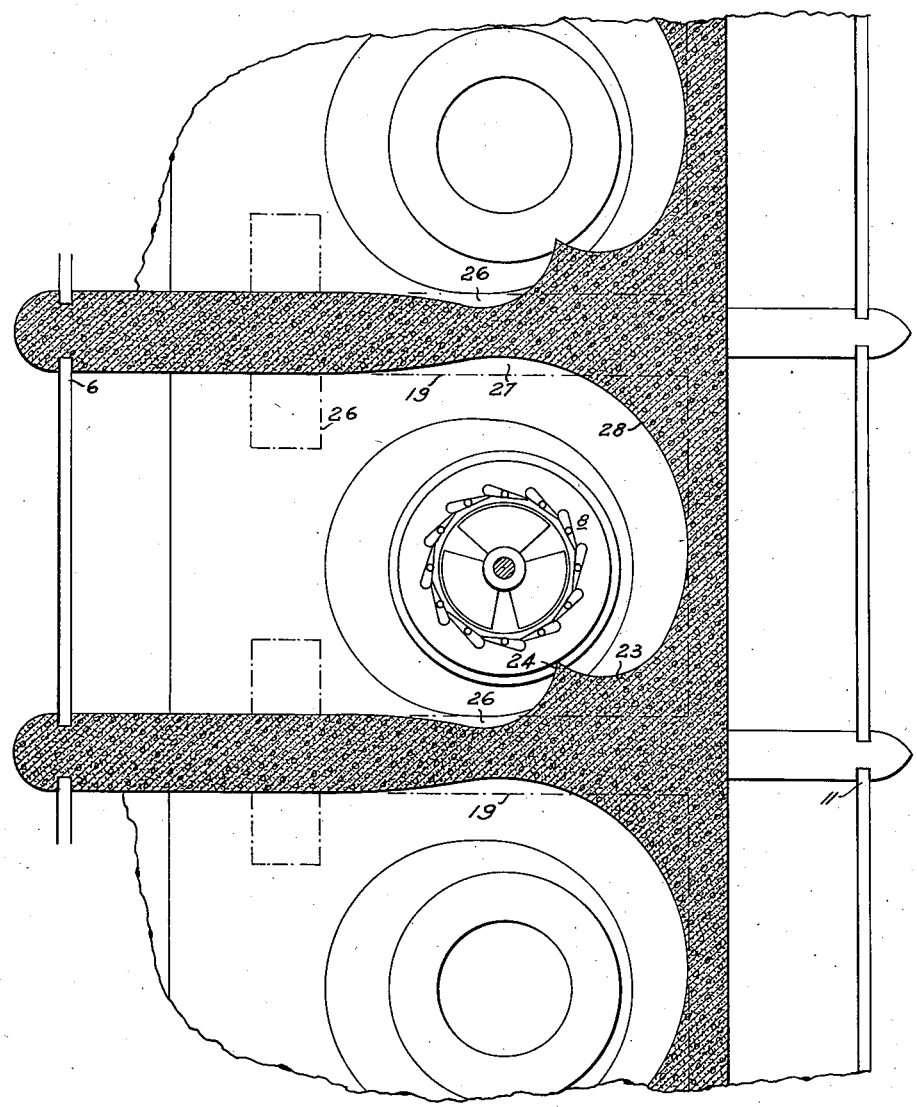

Objects and advantages other than those above set forth will be apparent from the following description when read in connection with the accompanying drawings, in which:

Fig. 1 is a somewhat schematic vertical sectional view through a hydraulic turbine installation of the vertical shaft open flume type and which embodies the present invention; and Fig. 2 is a horizontal sectional view taken on a plane through the line II—II of Fig. 1 and illustrating the required changes in the plan of the flume to produce the spiral casing sections required with a higher velocity of water flow through the flume.

Referring more particularly to the drawings by characters of reference, the reference numeral 6 designates bulkhead construction in a forebay forming the inlet to a flume and provided with slots to receive stop logs (not shown) to provide a headgate as is usual. It will be understood, of course, that any other type of headgate may be used instead of the stop logs mentioned. Such headgate controls the flow of water into a flume 7 from which the water flows through a hydraulic turbine 8 into a draft tube 9 from which the water discharges into a tailrace defined by the bulkhead 11, also arranged to be provided with stop logs or other suitable gate (not shown). The shaft of the turbine 8 extends upwardly therefrom and is connected with the mechanism to be driven, herein indicated as being an electric generator 12. The generator is mounted directly on the floor 13 of the power house and it is assumed that the position of the generator is previously fixed and cannot be varied. It is usual, particularly in installations with a plurality of open flumes, to place the generators in such position that the turbines are located substantially centrally in the flume, thereby securing proper spacing of the several units.

Each of the flumes 7 is substantially separated from the space above the turbine and below the generator by a deck 16 which is provided with apertures 17 therethrough. Such space is also preferably connected with the atmosphere as by an opening 18 in the downstream wall of the flume below the power house floor 13. The deck 16 is so located that, at normal headwater level, the water flow through the apertures 17 covers the deck. At high headwater level the deck 16 is covered by a depth of water depending on the location of the vent 18 and on the location of means, such as stop logs, for changing the height of the discharge edge of the vent. In installations with a plurality of parallel open flumes, the walls between the flumes are usually only of sufficient thickness to withstand the pressure of the water therein and to support the required superstructure and the machinery located therein. It is, therefore, necessary that any changes in the flume form be carefully designed to avoid substantially decreasing the thickness of the flume walls. The dotted line 19 in Fig. 2 indicates the inner surface of the lateral walls of each flume before any change has been made therein. To obtain the proper spiral form of flume, at least in the lateral walls of each flume, it is necessary that one of such walls be built out into the flume as shown by portion 23 to produce the properly curved surfaces and to form a baffle 24 beyond which the water cannot flow around the turbine in either direction from the inlet. In the other side walls of the flume, the portions 26 and 27 are cut back from the old flume wall and the portion 28 is brought within the boundary of the former flume wall. A flume form is thus obtained, with only minor disturbance thereof and without materially reducing the total thickness of the wall, in which the lateral surfaces are curved to form spiral casings extending in opposite directions and supplied from a common inlet by which water is properly distributed to all portions of the turbine runner. With the new form of flume it will be seen that the turbine is now located in the proper position to use the spiral form of flume to the greatest advantage. Due to change in the walls of the flume only, however, it has not been necessary to vary the predetermined position of the turbine and accordingly to disturb the location of the generator within the power house.

With the improved construction disclosed in the present application, a spiral form of flume is obtained which may be employed to deliver a flow of high velocity water with adequate distribution to all portions of the turbine runner to thereby permit the use of high speed turbines. Even though such spiral casings produce eddies and whirls in the water flow which, unless stopped, draw air into the turbine with its attended consequences of corrosion and lowered efficiency; when a whirl occurs in the flume, water is fed downwardly thereinto through the apertures 17 in the deck 16 thus interrupting the swirling action and insuring the provision of a constant and uniform flow of water for the turbine. The space above the deck 16 also acts as a differential surge chamber which equalizes the flow of water to the turbine by supplying water upon the quick opening of the gates and by receiving excess water when the turbine gate is closed or when any other variation in flow of the water occurs which would cause the occurrence of continuing surges. The spiral form of casing is obtained without materially decreasing the strength of the walls of the flume when such walls form partitions between adjacent flumes and an eccentric mounting of the turbine is obtained to complete the spiral formed by the flume without in any way disturbing the location of the driven apparatus in the power house.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a hydraulic turbine installation, a flume for guiding the flow of water, a hydraulic turbine mounted in said flume, the lateral walls of said flume being formed to provide partial oppositely directed spiral casings for distributing water to said turbine, and a deck extending across said flume and cooperating with said turbine to divide said flume substantially into a plurality of intercommunicating chambers, one of the chambers functioning as a surge chamber for said flume.

2. In a hydraulic turbine installation, an intake flume for guiding the flow of water to a hydraulic machine, a hydraulic turbine mounted in said flume, the lateral walls of said flume being formed to provide partial oppositely directed spiral casings for distributing water to said turbine, a draft tube for guiding the flow of water discharged from said turbine, and a deck extending across said flume and cooperating with said turbine to divide said flume substantially into a plurality of chambers, said deck being provided with a plurality of apertures to permit interchange of water between the chambers.

3. In a hydraulic turbine installation, a flume for guiding the flow of water, a hydraulic turbine mounted in said flume, said flume being formed to direct the water flow in different paths to said turbine from a common inlet, the lateral walls of said flume being formed to provide partial oppositely directed spiral casings for distributing water to said turbine, and a deck extending across said flume and cooperating with said turbine to divide said flume substantially into a plurality of intercommunicating chambers, one of the chambers functioning as a surge chamber for said flume.

4. In a hydraulic turbine, a flume for guiding the flow of water thereinto, a hydraulic turbine arranged to receive such flow, and a deck extending across said flume above the inlet to said turbine and below the level of the source of water supply, said deck substantially dividing said flume into a chamber forming an inlet chamber for said turbine and a chamber acting as a surge tank, the chambers being interconnected by a plurality of apertures through said deck.

5. In a hydraulic turbine, an open flume for guiding the flow of water thereinto, a hydraulic turbine arranged to receive such flow, and a deck extending across said flume above the inlet to said turbine and below the level of the source of water supply, said deck substantially dividing said flume into a plurality of interconnected chambers, one of the chambers functioning as a surge chamber for said flume.

6. In a hydraulic turbine, an open flume for guiding the flow of water thereinto, a hydraulic turbine arranged to receive such flow, means arranged within said flume for causing a portion thereof to act as a surge chamber having a discharge vent at the normal head water level, and means for changing the discharge level of said vent.

ARNOLD PFAU.